April 28, 1953

H. B. VAN DORN 2,636,379

RADIAL-PLAY GAUGE

Filed Dec. 20, 1947

Inventor
HORACE B. VAN DORN

By Mitchell Bechert
Attorneys

April 28, 1953 H. B. VAN DORN 2,636,379
RADIAL-PLAY GAUGE
Filed Dec. 20, 1947 2 SHEETS—SHEET 2

Inventor
HORACE B. VAN DORN
By Mitchell Bucher
Attorneys

Patented Apr. 28, 1953

2,636,379

UNITED STATES PATENT OFFICE 2,636,379

RADIAL-PLAY GAUGE

Horace Bishop Van Dorn, New Britain, Conn., assignor to The Fafnir Bearing Company, New Britain, Conn., a corporation of Connecticut Application December 20, 1947, Serial No. 793,021

10 Claims. (Cl. 73—37.5)

My invention relates to an improved gaging instrument, particularly for use in the determination of radial play in antifriction bearings.

In antifriction bearings, especially those in which an inner and an outer ring are radially separated by antifriction elements, it has in the past been difficult to determine with accuracy, on a production-line basis, the extent of radial play of the inner ring with respect to the outer ring. Previous methods and devices have required close and tiring attention by the operator or inspector, with the result that radial-play tolerances have had to be greater than is often desired.

It is, accordingly, an object of my invention to provide an improved gaging device of the character indicated.

It is another object to provide an improved radial-play gage for antifriction bearings.

It is also an object to provide an improved gage that will be simple to operate and that will be relatively non-fatiguing for the operator or inspector.

It is still another object to provide a gage of the character indicated which may be adapted with minimum difficulty to the radial-play gaging of a wide range of bearing sizes.

It is in general an object of my invention to provide a more reliable, accurate, and simple gage that will be easy to interpret and that will not be subject to loss of calibration for extended periods of time.

Other objects and various further features of the invention will be pointed out or will occur to those skilled in the art from a reading of the following specification in conjunction with the accompanying drawings. In said drawings, which show, for illustrative purposes only, a preferred form of the invention:

Figure 1:
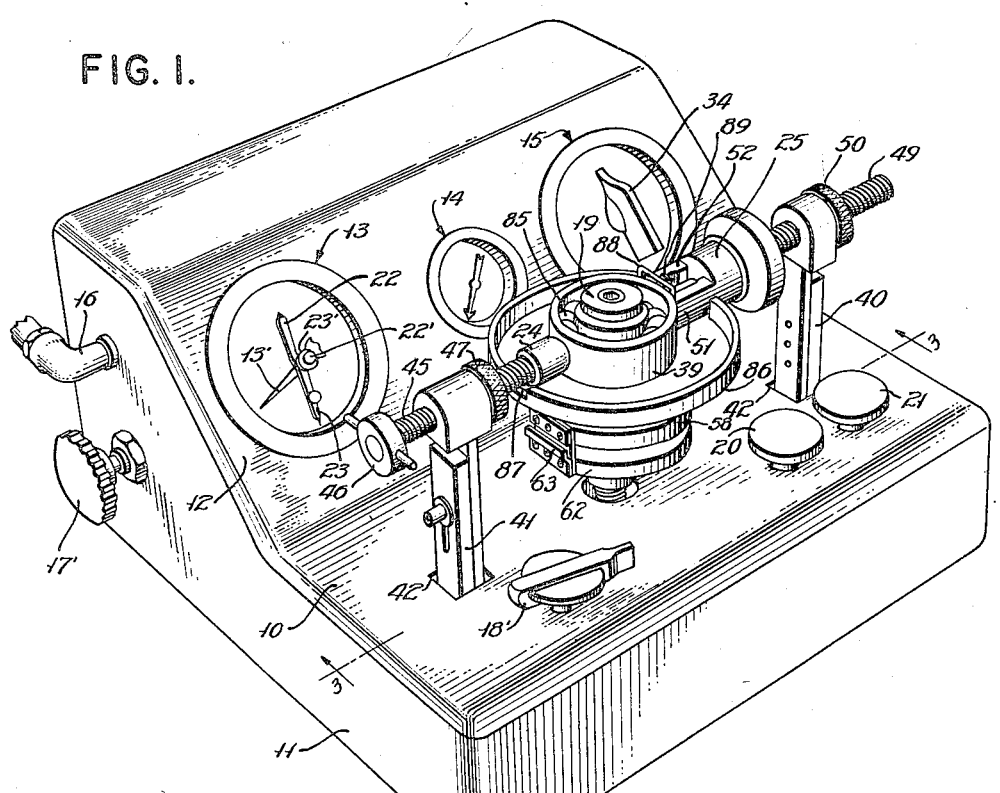
Fig. 1 is a perspective view of an instrument incorporating features of the invention and shown ready for use in the measurement of radial play in an antifriction bearing.

Briefly stated, my invention contemplates an improved apparatus for measuring the radial play in an antifriction bearing. In use, and in a preferred form of apparatus, a gaging element is arranged to support one ring of an antifriction bearing, and the other ring of the bearing is displaceably urged on a radial axis so that a first limiting relation of elements is obtained. The other ring is then urged on the same axis but in the opposite direction until a second limiting relation of elements is obtained. The relative displacement of the bearing rings for these two relationships is noted, and this displacement represents radial play in the bearing.

In the preferred form to be described, the inner bearing ring is loosely mounted on a plug, and air gages are employed to measure the displacements of the inner ring and of the outer ring with respect to the gage member. Reversible fluid-pressure operated means serves to load the outer bearing ring with respect to the gage member so as to effect the above-noted displacements. The air gages are air outlets or orifices, one of which is adapted to be more constricted as the outer bearing ring is urged in one direction, and the other of which is adapted to be more constricted as the outer bearing ring is moved in the opposite direction. One of the gages responds essentially to displacement of the inner bearing ring, and the other of the gages responds essentially to the sum of displacements of both the outer and inner bearing rings. Pressure readings noted for both loading positions contain factors representing looseness of fit of the inner ring on the plug, whereas only one of these readings contains a factor representing radial play in the bearing. The difference between the two readings is, of course, the radial play in the bearing.

Referring to the drawings, my invention is shown in application to a complete self-contained gaging instrument, with a housing or frame including a front plate or platform 10 between spaced side members 11. To the rear, the housing slopes upwardly at a panel 12 for the accommodation of various indicating dials 13—14—15 to be observed by the operator. In the form to be described, the entire device operates from a single supply of air, which is preferably filtered, and the inlet connection may be made on one of the side panels 11, as at the elbow 16. The bearing to be tested or measured for radial play is supported more or less centrally and at the front of the gage, and controls 20—21 for reversibly loading the test bearing are also conveniently accessible at the front.

As indicated above, I employ a single source of compressed air for supplying both the loading and the gaging systems of my instrument. To supply the gage, the inlet supply from pipe 16 is diverted through a T-connection to a hand-controlled regulating valve 17, which may be operated by a knob 17' accessible externally of the assembled instrument. The function of the valve 17 is to supply a constant-pressure outlet, independent of transient fluctuations in supply-line pressure. The regulated pressure at the outlet of valve 17 may be displayed on an indicating dial 14 and may, therefore, be constantly monitored by the operator. For a purpose which will later be clear, I employ an additional constriction in the gage line, and this constriction is preferably an adjustable valve 18. The valve 18 may be a compensating throttle or needle valve and preferably has a control knob or handle 18' accessible at the front of the assembled instrument. The pressure adjusted by the needle valve 18 may be viewed on any desired pressure or flow indicator such as a manometer, rotameter, or the like, but in the form shown pressure is read on the dial 13 of a Bourdon gage by observing the motion of the indicator needle 13'. For a purpose which will also later be clear the dial 13 is shown further to include two manually adjustable pointers or needles 22—23 with externally accessible control knobs 22'—23'. The pointers 22—23 are preferably so mounted that an adjustment of, say, the needle 22 by the knob 22' will not be disturbed by a manual setting of the pointer 23 when the knob 23' is turned.

In loading the outer ring of the test bearing, I employ a bridge or clamp construction having opposed members 24—25 to abut generally diametrically opposed parts of the outer bearing ring. The clamp or bridge structure may be fastened to the piston rod 26 of a double-acting cylinder 27, which may be operated from the same air-supply source 16 as has been described for the gage 19. For operating the loading mechanism, another regulating valve 28 may be coupled to the other arm of the T-connection at the inlet 16, and the reduced pressure may be further regulated by a needle or throttling valve 29. The regulating valve 28 is shown to have an externally accessible control handle 34 on dial 15, for the ready selection of loading pressures, depending upon the loading specified for various sizes of bearings. Pressure in the outlet of valve 29 may be considered constant for all practical purposes and may be supplied to the head end 30 or to the tail end 31 of cylinder 27 by selective operation of valve means 32—33, respectively. In the form shown, the knob 20 at the front of the machine may be depressed to operate the valve 32, and the knob 21 may be depressed to operate the valve 33. Thus, it will be clear that upon pressing the knob 20 pressure fluid is admitted to the head end 30 of cylinder 27 so as to urge the outer bearing ring to the left with respect to the gage 19 (i. e. to the left in the sense of the drawings) and that when the knob 21 is depressed, the outer bearing ring is urged in the opposite direction to produce the same loading force.

Figure 3:
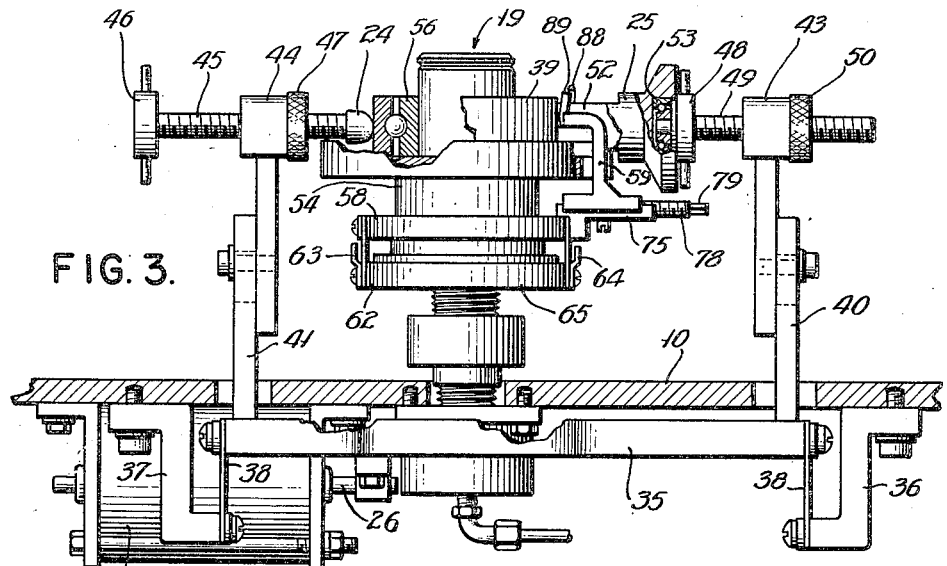
Fig. 3 is a partly sectionalized, partial assembly of the device of Fig. 1, the section being taken substantially in the vertical plane 3—3 of Fig. 1.

In Fig. 3, the loading clamp will be seen, in the form shown, to comprise a relatively rigid bar 35 running transversely of the instrument below the frame plate 10, and to be mounted for relatively frictionless displacement on a generally transverse axis. The mounting for bar 35 may include two spaced brackets 36—37, secured to the underside of the plate 10 and supporting mounting strips 38, preferably of spring metal. The free ends of strips 38 are secured to opposite ends of the bar 35. In the form shown, the members 24—25, which directly engage the outer ring 39 of the bearing to be calibrated, are adjustably mounted on upright standards 40—41 carried at opposite ends of the bar 35 and extending through openings 42 in the frame plate 10. The standards 40—41 may each vertically adjustably support bosses 43—44, having axes to be aligned with the central plane of the test bearing to be calibrated. In order to calibrate a number of sizes of test bearings, the loading element 24 is carried at the end of an adjustable threaded member 45 in threaded engagement with the boss 44. A handle 46 on member 45 serves to position the element 24, and a locking ring or nut 47 may tightly secure the adjustment.

On the other side of the instrument, the loading element 25 is shown similarly mounted, for adjustment by means of a handle 48 on a threaded member 49 threaded into the boss 43. A locking ring 50 serves to hold adjustments made by turning the handle 48. In order to assist in centering the outer bearing ring 39 on the axis of thrust produced by the loading elements 24—25, I prefer that one of these elements 25 be provided with spaced feet 51—52, so that the bearing ring 39 may be clamped or supported at three points about its periphery; the feet 51—52 are preferably spaced by a distance equal to or greater than the span between two adjacent anti-friction elements of the bearing being measured. Since the loading element 25 should not be rotated upon adjustment of the handle 48, I provide thrust-sustaining bearing means 53 between the handle 48 and the loading element 25 to permit relative rotation of these parts; it will be understood that the bearing means 53 may perform the additional function of permitting the loading element 25 a slight swivelling action, so as to allow the outer bearing ring 39 to seek a position such that the inner and outer recess fall in the same plane when loading forces are applied.

As indicated generally above, the gage member 19 may comprise a block 54 having a radially directed orifice or opening 55 to face an inner part of the inner ring 56 of the bearing to be calibrated. The block 54 is preferably cylindrical and in the form of a plug easily and yet relatively closely to fit the inner bearing ring 56; the block 54 may thus be said radially loosely to support the inner bearing ring 56. In communication with the opening 55 is a further opening 57, preferably on an axis parallel to the axis of opening 55 but facing in the opposite direction.

While the opening 55 is positioned to be constricted more or less by the relative proximity of the inner bearing ring 56, the opening 57 is positioned to be constricted more or less in accordance with displacements of the outer bearing ring 39. In the form shown, the second opening 57 is constricted by a displaceable member in the form of a ring 58, preferably displaceable only on an axis parallel to the loading, i. e. parallel to the axis of screws 45—49. The displaceable member 58 may include a part overstanding the opening 57 and another part in the form of a finger 59 projecting to engage the outer bearing ring 39, preferably on the loading axis.

If desired, the displaceable ring 58, and with it the finger 59, may be mounted on the gage 19 by a spring suspension similar to that employed for the loading structure. Thus, preferably diametrically opposite portions of the ring 58 may be supported on resilient strips 60—61 secured also to a flange 62 formed in the body of the gage 19. To prevent damage due to external abuse of the resilient suspension members 60—61, guard brackets 63—64 may be secured on the flange 62 adjacent the strips 60—61.

In order that the gage 19 may be readily adaptable to a number of different sizes of bearing, the body of the gage may be formed essentially of two parts. The first part may comprise the plug member 54 which has already been described, and this part 54 is preferably one of a number of special plugs closely to fit a number of test-bearing sizes. The first part or plug 54 may be seated replaceably on a second part, in the form of a base 65, and it may be secured to the base 65 by a central screw 66, which may be drilled (as at 67) to provide an internal air passage. An annular groove 68 serves as a manifold to join the gage opening 57 with the central passage 67 through a transversely extending hole 69. In like manner, an annular groove 70 at the upper end of bolt 66 provides a manifold for distribution of air to the other gage opening 55, via a transverse hole 71. In the form shown, the assembly is rendered air tight by means of a plug 72 driven into the upper end of passage 67 and by means of gaskets 73—74 between the head of bolt 66 and the plug member 54, and between plug member 54 and the base 65, respectively.

In order to render my gage more adaptable to various sizes of test bearings, I provide means for adjustably positioning the finger 59 with respect to the displaceable ring 58 upon which it is mounted. The displacement action is preferably such as to maintain contact of finger 59 with the outer bearing ring 39 always substantially on the axis of loading, that is, substantially on the axis of screws 45—49. In the form shown, the finger 59 is slidable upon a bracket 75 held by screw 76 to the ring 58, and a downwardly opening channel having side members 77 on finger 59 serves to maintain well guided alignment of the finger 59 with the top of bracket 75. For adjustment purposes, a semicylindrical groove in the bottom of the channel on finger 59 may be threaded for a screw 78, which in turn may be formed with wrench-engaging flats 79 milled on the extended end thereof. Opposite the threaded groove on the finger 59, the bracket 75 may be hollowed out, as at 80, to accommodate the screw 78 but not to engage the same except at 81, where a projection engages an annular groove formed deeper than the threads of screw 78. It will be clear that upon wrench adjustment, as at 79, the finger 59 may be displaced as desired along the bracket 75. Once a desired adjustment has been obtained, a securing screw 82 may be tightened so as to clamp bracket 75 and the finger 59 together. In the form shown, securing screw 82 is threaded into the finger 59 through a slot 83 in bracket 75.

A better appreciation of my gage instrument may be had from a description of a typical calibration or measurement of radial play for a radial ball bearing of the type shown in the drawings. A plug element 54 is first selected freely to accommodate the inner bearing ring 56 of the specimen, and this plug 54 is securely mounted upon the base 65 by means of the bolt 66. The standards 40—41 are then adjusted for height so that the axes of screws 45—49 will be aligned more or less on the plane which includes the race centers of the test bearing. Adjustment is then made with nut 47 and handle 46, and with nut 50 and handle 48, to assure that the loading members 24—25 clear the ring 39 slightly, that is, preferably without stress on the standards 40—41. The displaceable collar or ring 58 is preferably normally positioned, eccentrically (to the left, in the sense of the drawings) of the base member 65; in this position the springs 60—61 may be balanced or at ease when no bearing is being measured, and a maximum clearance may be observed between collar 58 and base 65 at the location of orifice 57. When the bearing to be measured is slipped down onto plug 54, the finger 59 (by virtue of the adjustment of screw 78) is urged to the right to flex springs 60—61 and to position collar 58 in a constricting but spaced relation with orifice 57; the finger 59 may thus be constantly urged with a light but positive force against the outer ring 39 of the bearing to be measured. Thus, the positioning of finger 59 may automatically be such as to permit finger 59 resiliently to follow or track the movement of the outer bearing ring 39 from one extreme loading position to the other, and throughout this movement the displaceable ring 58 is preferably always at least slightly spaced from the gage opening 57.

Figures 5, 6:
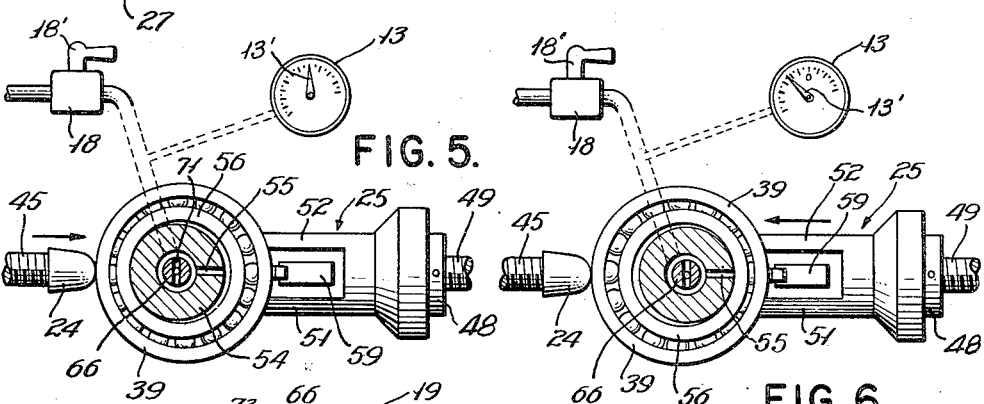
Figs. 5 and 6 schematically illustrate two relative positions of parts in a gaging process performed with the instrument of Fig. 1.
Figure 4:
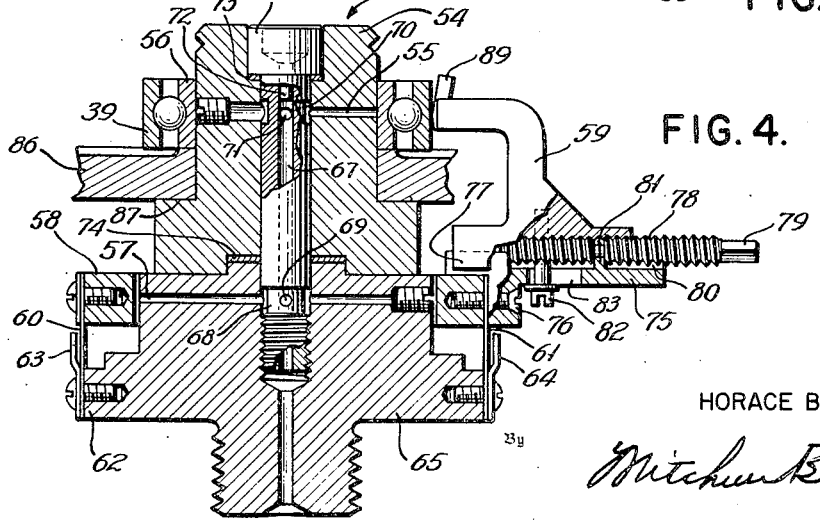
Fig. 4 is an enlarged vertical sectional view of a part of the gage of Fig. 1.

The instrument is now set up for a measurement, and one of the keys 20—21 is depressed in order to load the bearing in one direction. If the key 21 is depressed, the valve 33 will be operated, to displace the loading bridge to the right in the sense of Fig. 3, that is, with the loading member 24 squeezing the test bearing against the plug 54 of the gage 19. Fig. 5 shows, with some exaggeration, the relationship that will then obtain for the test-bearing elements with respect to parts of the gage. It will be seen that the upper gage opening 55 is spaced a maximum distance from the inner surface of the inner ring 56 and that, therefore, the air spilled through the orifice 55 will be at a maximum flow, so as to provide a first indication or reading on the dial of the meter 13. By suitable adjustment of the supply pressure, as by the handle 18' of needle valve 18, the needle 13' on the meter 13 may be adjusted to read zero, as shown. It will be appreciated that, while the opening 55 has been caused to discharge into a space representing a clearance between a plug 54 and the inner ring 56, the outer ring 39 has urged the finger 59 to the right to cause the displaceable ring 58 into a maximum constricting position opposite gage opening 57, although, as previously suggested, the opening 57 may never be completely closed off. The pressure noted on the dial 13 will be understood to be an indication of the maximum air spilled through opening 55 and of the minimum air spilled through opening 57; this pressure may, therefore, be said to represent the clearance between the plug 54 and the inner bearing ring 56, plus the minimum radial spacing of ring 58 from opening 57.

Having adjusted valve 18 to bring the needle 13' of meter 13 to zero, the other control key 20 may be depressed to operate the valve 32 and thus to reverse the loading. With such loading, the gage and bearing parts will assume relative positions like those shown exaggerated in Fig. 6. The plug 54 will now be in close abutment with the inner ring 56 so as to close off the opening 55, and the finger 59 will have been displaced to the left under the action of springs 60—61, as permitted by the leftward displacement of the outer bearing ring 39 (the springs 60—61 having been prestressed by finger 59 when the test bearing was inserted on plug 54).

The actual displacement of the outer bearing ring 39 from the first-described limiting position (Fig. 5) to the second-described limiting position (Fig. 6) will be appreciated as being not only the radial clearance between plug 54 and inner ring 56, but also the radial play between the bearing rings 39—56 and the antifriction elements therebetween. Leftward displacement of the finger 59 permitted the displaceable member 58 to move to the left and thus additionally to open the orifice 57 by an incremental amount representing the actual displacement of the outer bearing ring 39, plus the clearance between plug 54 and inner ring 56. The needle 13' on dial 13 will, therefore, indicate a pressure representing the change in flow through the air-passage system of the gage 19. Having adjusted the needle 13' to read zero for the Fig. 5 relation of parts, the needle 13' may (in the Fig. 6 relation of parts) be direct reading of the actual radial play in the test bearing, because the clearance representing looseness of fit between plug 54 and inner bearing ring 56 (and also representing minimum spacing of ring 58 from opening 57) has occurred in both loading positions, and this clearance is in effect subtracted out in the described method of measuring radial play.

If it is not desired to adjust the valve 18 for a zero reading on dial 13 for each test bearing, then radial play may be determined with almost equal facility by setting the hand pointer 22 to coincide with needle 13' for one loading condition (say, the Fig. 5 relationship), and the hand pointer 23 may be adjusted over the needle 13' for the other loading condition (Fig. 6 relationship). The observed spread between hand pointers 22—23 will then represent radial play in the test bearing, as will be clear.

My measuring instrument has been described particularly for use in measuring radial play, but it is clear that other operations may be performed more or less concurrently with the measurement of radial play. For example, bearings may be assembled on the instrument by first placing matched inner and outer bearing rings 56—39 over the plug 54 and by then inserting a set of matched antifriction elements 85 of size intended to fit the matched inner and outer rings 56—39. To assist in this assembling operation an annular tray 86 may be seated against a shoulder 87 in the plug 54, and the tray 86 is preferably of sufficient thickness to support the race of the inner bearing ring 56 in proper alignment with the gage orifice 55. The tray 86 may have an outer retaining wall so as to prevent loss of stray balls and to hold the matched antifriction elements 85 ready for assembly into the inner and outer bearing rings, and this outer wall may be cut away, as at 87, to accommodate the loading elements which must engage the outer bearing ring 39. In the first assembly of a set of matched elements 85 in matched rings 56—39 does not produce a desired minimum radial play, a second set of matched elements 85 may be assembled with the same rings 56—39, and tested with minimum delay, as will be clear.

In order to speed up the assembly and measurement techniques described, I provide a guard ring or loop 88 between feet 51—52 of loading element 25, and the ring 88 preferably extends over an upwardly extending and backwardly sloping projection 89 on finger 59. It will be appreciated that the function of projection 89 may be to engage the outer bearing ring 39 as it is inserted over the gage and gently to cam the finger 59 to the right in order properly and gradually to stress the springs 60—61, as previously described. The ring or loop 88 merely safeguards projection 89 against shock which otherwise might cause loss of calibration at screw 78.

For certain types of precision bearings, test specifications may require that the radial-play measurement be made with the axis of the test bearing horizontal and with the loading axis in the then vertical plane of the ball and race centers. My instrument may readily conform to this kind of specification by merely tipping the housing to rest on its side, preferably on the right side, so that the side 11 and regulator knob 17' will face upwardly.

Figure 2:
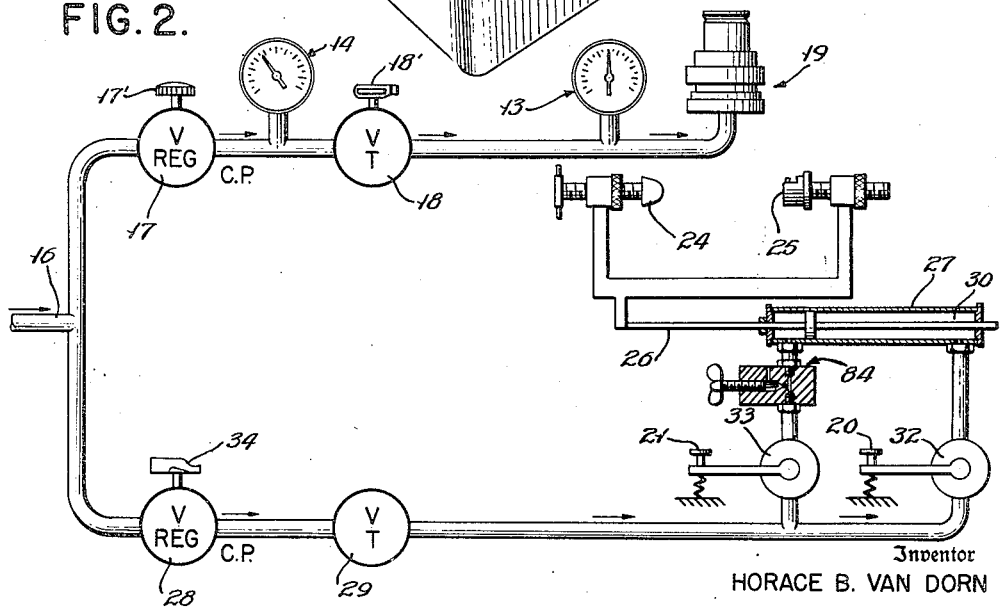
Fig. 2 is a diagram schematically illustrating control means for the device of Fig. 1.

In the described tipped position, the loading axis (i. e. screws 45—49) will be vertical, and the weight of the test bearing and of the loading-bridge structure will have a preloading effect in the down direction. To offset this preloading effect, and in order to assure a match between loading forces in opposite directions, I may employ a needle-type bleed valve or gravity compensator 84 (Fig. 2) in one of the supply lines to the loading cylinder 27. In the form shown, such bleed means 84 is preferably in the supply line of valve 33, so that reduced loading pressures may be applied in the down direction, as compared with those applied in the up direction. The difference in loading pressures applicable at the head and tail ends of cylinder 27 should be such that loading forces on the antifriction elements 85 of the test bearing are equal in both directions, and this adjustment may clearly be made by means of the adjustable bleed or gravity compensator.

While in the form shown the test bearing has been described as being loosely fitted over the plug gage element 54, it will be clear that other arrangements may be employed to obtain similar results, using the same relative motions and forces. For example, the inner bearing ring 56 could be fixedly held as by an expanding collet or chuck (or by snugly fitting the test bearing on the plug 54 so as effectively to close off opening 55 for both loading positions), and the same apparatus (now utilizing only the gage opening 57) would produce differential pressure readings indicative of radial play. Also, with the same relative motions, the outer bearing ring 39 could be the loosely or fixedly supported ring, and loading forces would be applied to the inner ring, preferably again on a diametral axis of the bearing.

It will be appreciated that I have described an ingenious instrument for the measurement of radial play in a bearing. The instrument has been successful in use and has proved its ability to perform the radial-play measurement quickly and with a high degree of accuracy. A single device constructed as described has been used for a wide range of sizes and types of bearings, including so-called precision bearings having the most strict radial-play specifications. Although my instrument has been described as lending itself to measurements with the test-bearing axis horizontal, I have found that for most cases measurements made with the test-bearing axis vertical are entirely satisfactory and consistent; in the latter event, the loading axis will be horizontal and the gravity compensator 84 is not necessary and may be shut off.

While I have described my invention in detail for the preferred form shown, it will be understood that modifications may be made within the scope of the invention as defined in the appended claims.

I claim:

1. In a gage of the character indicated, a first gage member to be inserted within the inner ring of an assembled antifriction bearing, said member having an internal passage with orifice means facing radially predominantly toward one side of the inner ring, a second member having an internal passage with orifice means on an axis offset from and generally parallel with the axis of symmetry of said first orifice means and oppositely directed with respect to said first orifice means and means including a probe radially spaced from said first member and for contacting the outer bearing ring and responsive to outer bearing ring position and for constricting said second orifice means as the antifriction bearing is urged along said first axis in a direction away from said first orifice means.

2. In a gage of the character indicated for measuring overall radial play in an assembled antifriction bearing including inner and outer rings spaced by antifriction elements, a first gage member including a cylindrical plug having a radially directed opening to face the inner ring of an assembled antifriction bearing into which said plug is to be inserted, said member having a second opening on an axis spaced from but generally parallel to the axis of said first opening and facing in the opposite direction, a second gage member including a part in constricting opposition to said second opening and a part generally aligned with the axis of said first opening and poised for contact with the outer bearing ring, said members being displaceable relatively to each other generally along an axis substantially parallel to the axes of said openings, and fluid-conducting means communicating with both said openings.

3. A gage according to claim 2, in which said second member is annular and generally coaxial with the axis of said plug, the inner surface of said annular member being opposite said second opening, in which said second part includes a finger rigidly carried by said annular member and projecting to engage the outer bearing ring at a point generally aligned with the axis of said first opening, and adjustable means for adjustably positioning the contact part of said finger generally along the axis of said first opening.

4. A gage according to claim 2, in which said first gage member includes a radially outwardly directed flanged portion spaced from the axis of said second opening, in which said second member includes an annular ring generally coaxial with the axis of said plug and of said flange, and generally diametrically opposed resilient suspension elements between said flange and said ring, said suspension elements providing flexibility in the relative displacement of said ring and of said first member generally along the axis of said second opening.

5. In a gage of the character indicated, a gage block having a pair of opposed openings one of which is to be effectively applied against the inner ring of an assembled antifriction bearing and the other of which is to react to the instantaneous location of a part of the outer ring of such bearing, loading means for reversibly urging the outer bearing ring generally along the axis of said first opening, said loading means including a bridge having portions to engage generally diametrically opposed parts of the outer bearing ring, a double-acting cylinder having a piston connected to urge said bridge generally parallel to the axis of said first opening, a source of substantially constant fluid pressure for said cylinder, and reversing valve means for selectively applying said fluid pressure to either end of said cylinder, whereby a given loading force may be reversibly applied to the outer bearing ring.

6. In a gage for determining radial play in a bearing including inner and outer bearing rings with interposed antifriction bearing members, orifice means, means for loosely radially supporting one ring of an assembled bearing with said one ring positioned to vary the constriction of said orifice upon radial movement of said ring relatively to said orifice, a second orifice means, common pressure-fluid supply means for both said orifice means, and means movable in accordance with radial movements of said second ring to vary the said second orifice in the sense opposite to that of said first orifice means for a given bearing displacement, and gage means connected to said pressure-fluid supply means to determine the pressures caused by variations in said orifices.

7. In a gage device for measuring overall radial play in an assembled antifriction bearing including inner and outer rings spaced by antifriction elements, a central plug member to loosely fit within the bore of the inner bearing ring and having a gage opening radially facing a part of the bore of the inner ring, bearing-displacement means including abutment means selectively movable generally on a diametrical axis that includes said gage opening, said abutment means being positioned to engage the outer bearing ring for selective movement of the outer bearing ring in each direction on said axis, whereby the inner bearing ring may be driven to a first position against said plug to produce a maximum clearance between said gage opening and the inner-ring bore, a second member fixed relatively to said plug member and having a gage opening on a diametrical axis generally parallel to said first axis but facing in the opposite direction to said first gage opening, said second gage opening being positioned to constitute a variable orifice in response to displacements of the outer bearing ring, fluid-pressure supply means communicating with said openings, and a pressure-metering connection communicating with said supply means, whereby upon driving the inner bearing ring against said plug in the opposite direction said second gage opening may be effectively opened to a maximum extent while said first opening is constricted to a maximum extent, so that, upon supply of pressure fluid to said openings, gage flows may in said first position represent a particular factor and in said second position represent overall radial play in the bearing plus the same particular factor.

8. In a gage device for measuring overall radial play in an antifriction bearing with antifriction elements assembled between inner and outer rings, central gage means fitting loosely within the bore of the inner bearing ring and having a gage opening radially facing a portion of the bore of the inner ring, further gage means including a first part fixed relatively to said central gage means and a second part movable toward and away from said first part, one of said parts having a gage opening facing the other of said parts, whereby upon relative movement of said parts said second-mentioned gage opening will be effectively varied, probe means associated with said second part and responsive to displacements of the outer bearing ring to close said second-mentioned gage opening for bearing displacements which open said first-mentioned gage opening, said probe means also being responsive to displacements of the outer bearing ring to open said second-mentioned gage opening for bearing displacements which close said first-mentioned gage opening, fluid-pressure supply means communicating with said openings, and pressure-responsive means communicating with said supply means.

9. In a gage device for measuring overall radial play in an antifriction bearing with antifriction elements assembled between inner and outer rings, first gage means fitting loosely within the bore of the inner bearing ring and including first measuring means radially adjacent a portion of the bore of the inner ring and responsive predominantly to movement of said portion radially toward and away from said first gage means, second gage means, including a first part fixed relatively to said first gage means and a second part movable toward and away from said part, second measuring means responsive to such relative movement of said parts, probe means associated with said second part and responsive to displacements of the outer bearing ring to cause opposite-sense responses for said first and second measuring means for a given bearing displacement, and further measuring means differentially responsive to the responses of said first and second measuring means.

10. In a gage device for measuring overall radial play in an antifriction bearing with antifriction elements assembled between inner and outer rings, a support means for radially loosely supporting the inner bearing ring, first probe means including an element radially adjacent a portion of the bore of the inner bearing ring and responsive to radial movement of the inner bearing ring, second probe means including an element radially adjacent a portion of the outer surface of the outer bearing ring and responsive to radial movement of the outer bearing ring on substantially the same radial axis as that of said first-mentioned radial movement, the responses of said probe means being of opposite sense for a given direction of bearing movement on said axis, and measuring means differentially responsive to the responses of both said probe means.

HORACE BISHOP VAN DORN.

References Cited in the file of this patent

UNITED STATES PATENTS

| Number | Name | Date |
| --- | --- | --- |
| 1,062,566 | Gohlke et al. | May 20, 1913 |
| 1,971,271 | Mennesson | Aug. 21, 1934 |
| 2,419,280 | Neff | Apr. 22, 1947 |
| 2,431,014 | Aller | Nov. 18, 1947 |
| 2,431,087 | Subber | Nov. 18, 1947 |
| 2,438,696 | Fox et al. | Mar. 30, 1948 |